(12) United States Patent
Matsunaga

(10) Patent No.: US 6,940,487 B2
(45) Date of Patent: Sep. 6, 2005

(54) INPUT UNIT AND INFORMATION PROCESSING UNIT

(75) Inventor: Katsuya Matsunaga, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 10/082,875

(22) Filed: Feb. 26, 2002

(65) Prior Publication Data

US 2002/0126087 A1 Sep. 12, 2002

(30) Foreign Application Priority Data

Mar. 6, 2001 (JP) ........................................ 2001-062472

(51) Int. Cl.⁷ ................................................ G09G 5/08
(52) U.S. Cl. ...................................... 345/156; 345/163
(58) Field of Search ................................ 345/163, 166, 345/184; 710/73; D14/402, 405, 407, 416

(56) References Cited

U.S. PATENT DOCUMENTS

| | | | | |
|---|---|---|---|---|
| 5,416,479 A | * | 5/1995 | Jondrow et al. ............. 345/157 |
| 5,949,406 A | * | 9/1999 | Kress ......................... 345/163 |
| 5,990,870 A | * | 11/1999 | Chen et al. ................. 345/156 |
| 6,163,326 A | * | 12/2000 | Klein et al. ................. 345/156 |
| 6,304,249 B1 | * | 10/2001 | Derocher et al. ........... 345/163 |
| 2001/0005198 A1 | * | 6/2001 | Sakamoto et al. .......... 345/163 |

* cited by examiner

Primary Examiner—Bipin Shalwala
Assistant Examiner—Laurel E. LeFlore
(74) Attorney, Agent, or Firm—Martin J. McKinley; Dillon & Yudell LLP

(57) ABSTRACT

An input unit having mouse functions is disclosed. The input unit is convenient for carrying and for storing in a notebook-sized personal computer. It has a reclosable finger support section, an open-close member having a switch and an open-close member having a switch on a plate-like main unit, and is operated as a mouse by sandwiching the finger support section between the forefinger and the middle finger. When it is not used, it is rendered plate-like by folding the finger support section, the open-close members so as to be stored in an IC card slot of the notebook-sized personal computer.

9 Claims, 11 Drawing Sheets

[Figure 1]
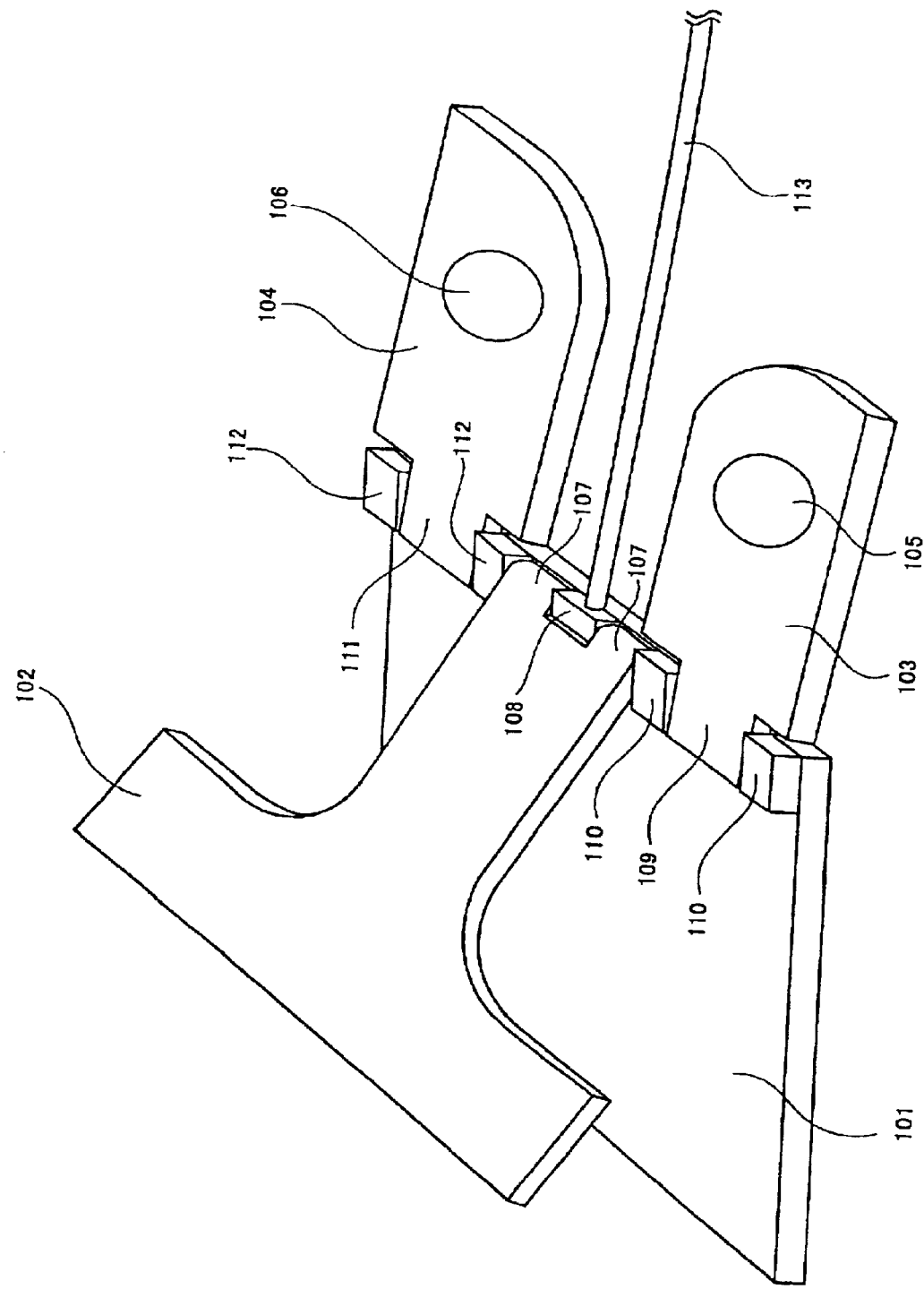

[Figure 2]
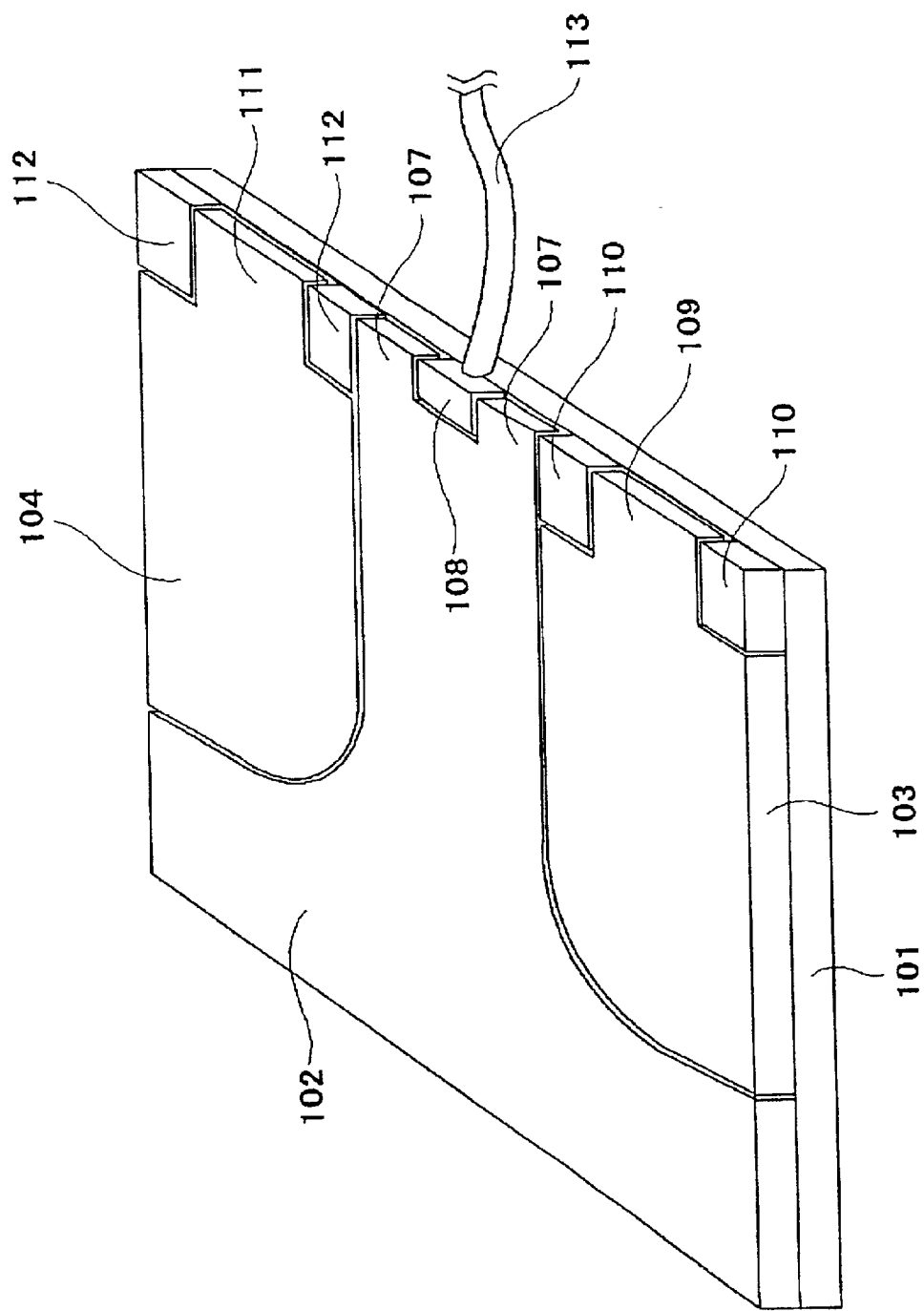

[Figure 3]
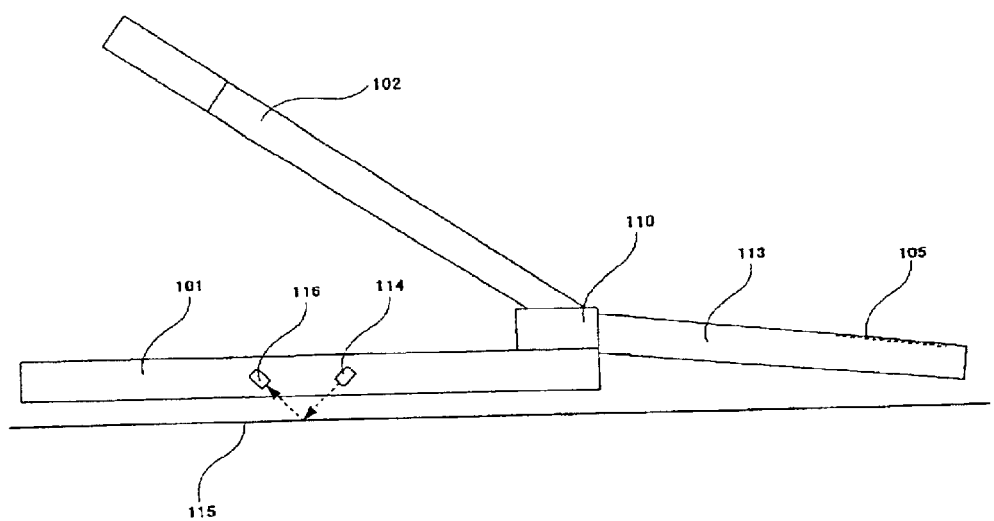

[Figure 4]
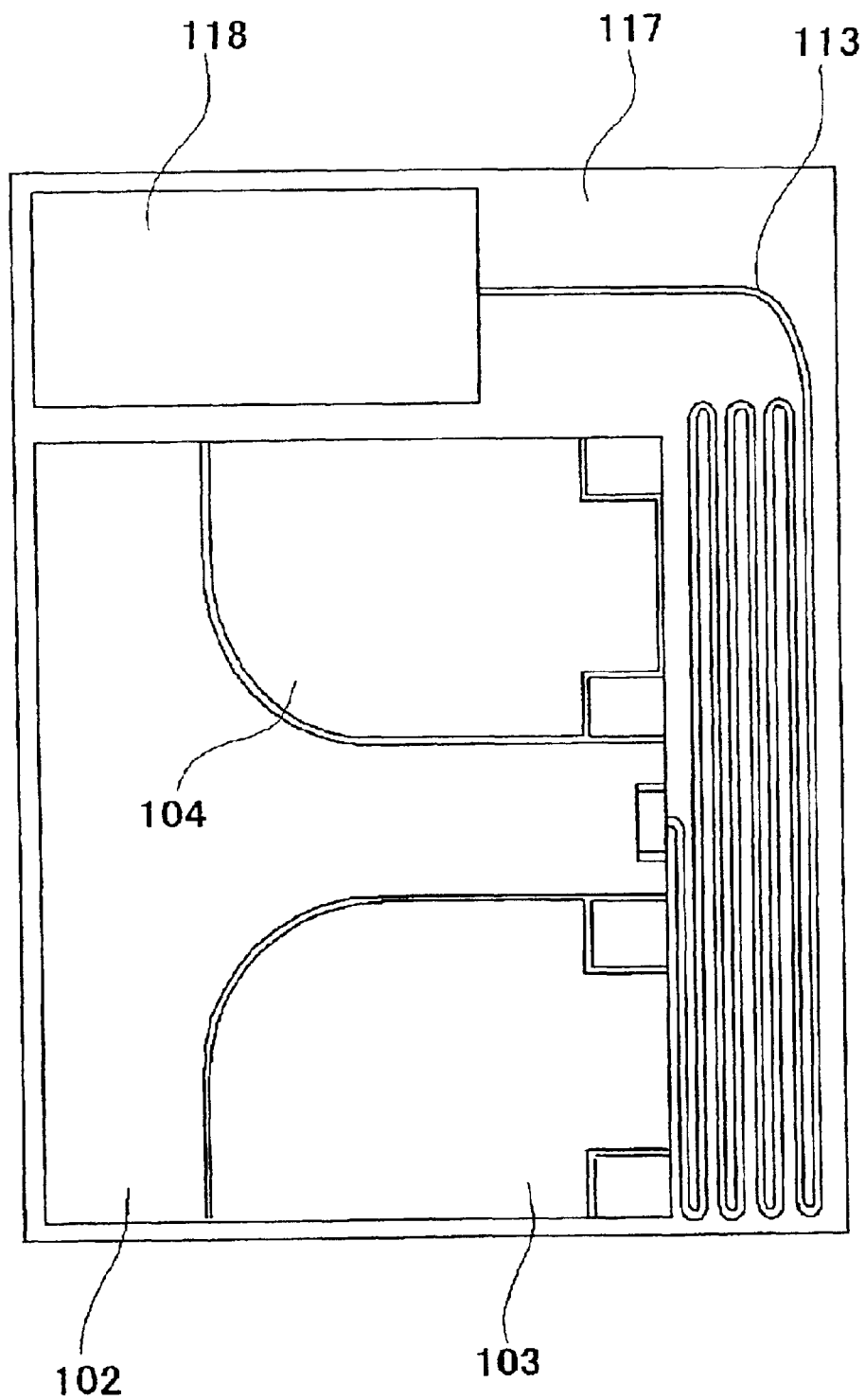

[Figure 5]
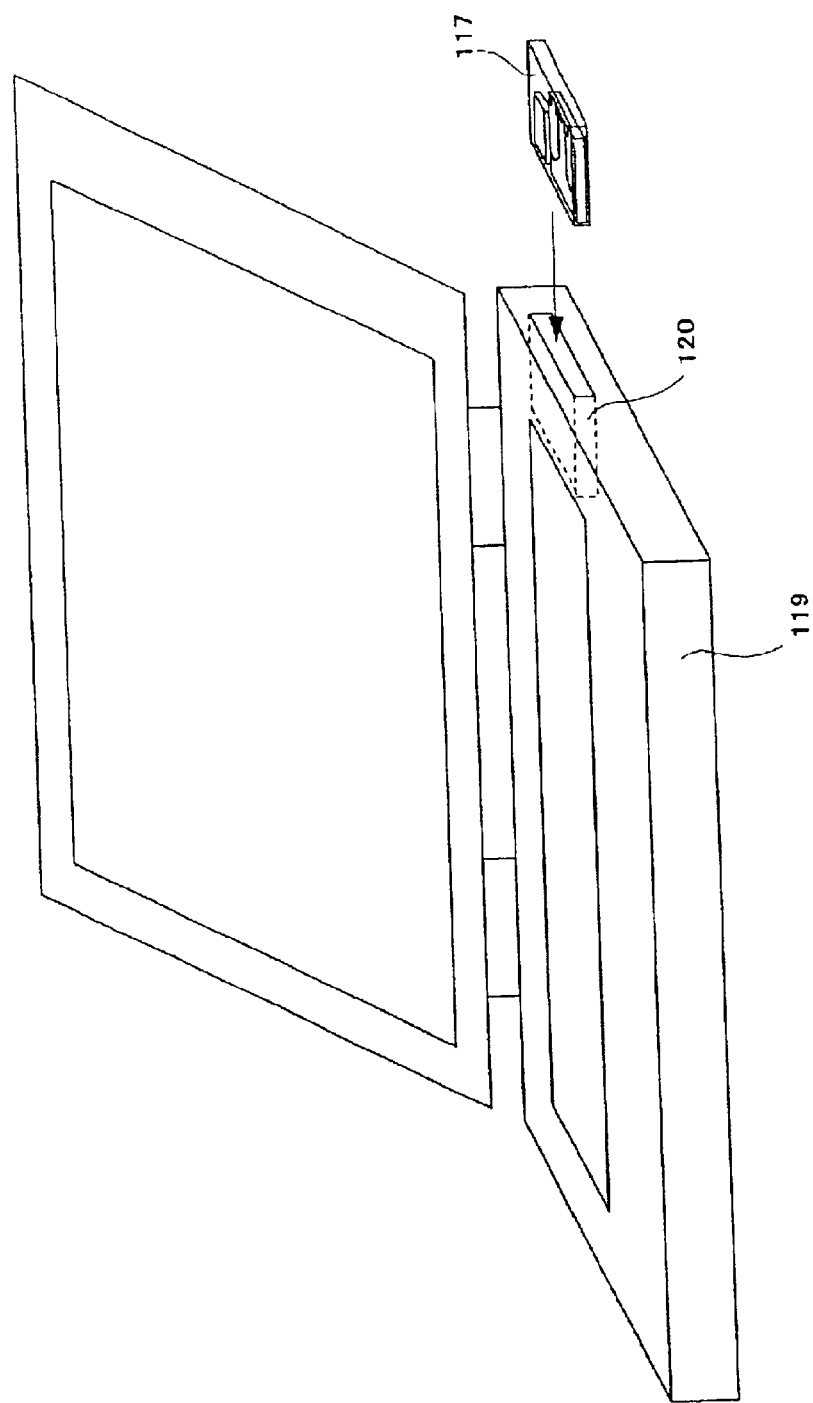

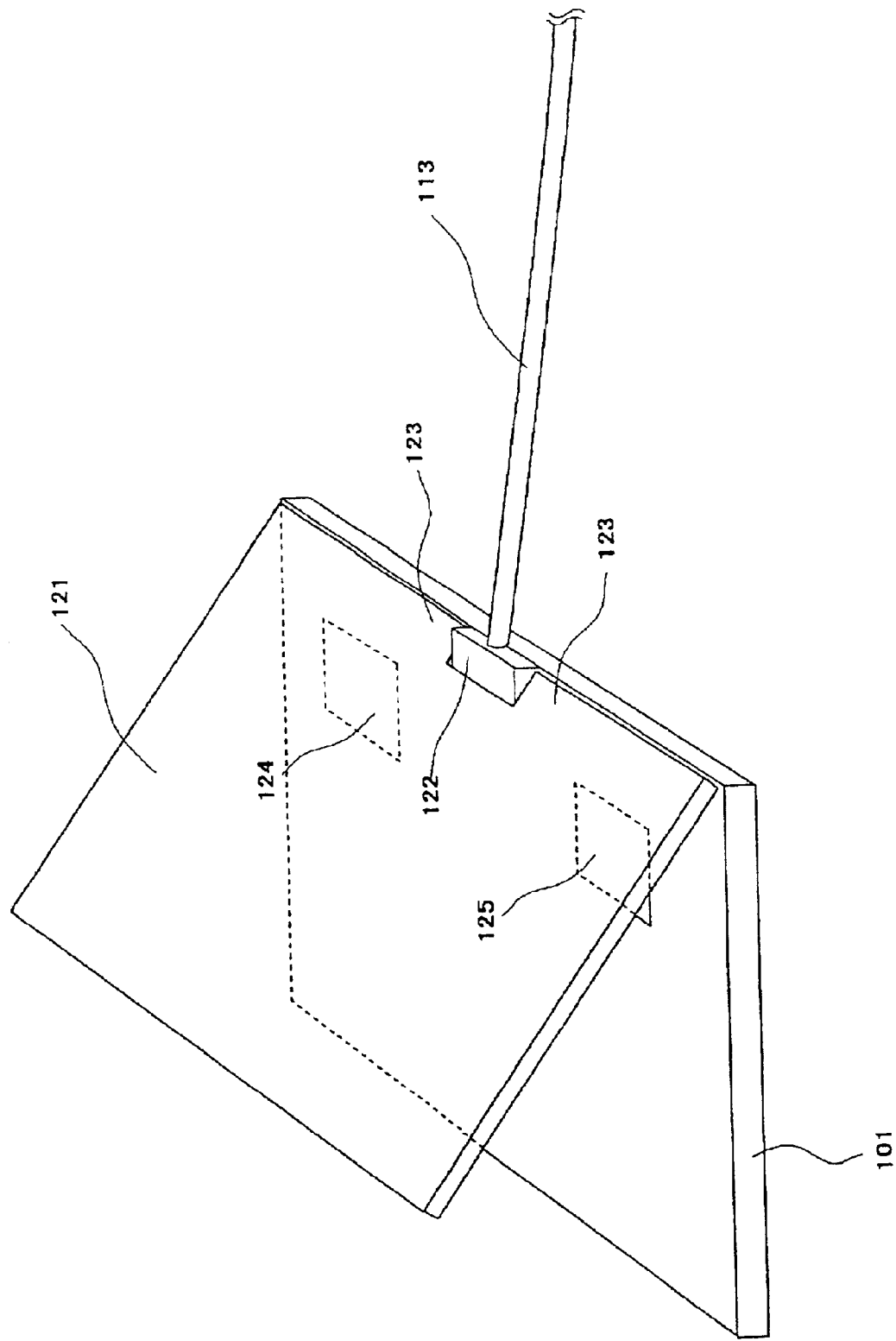
[Figure 6]

[Figure 7]
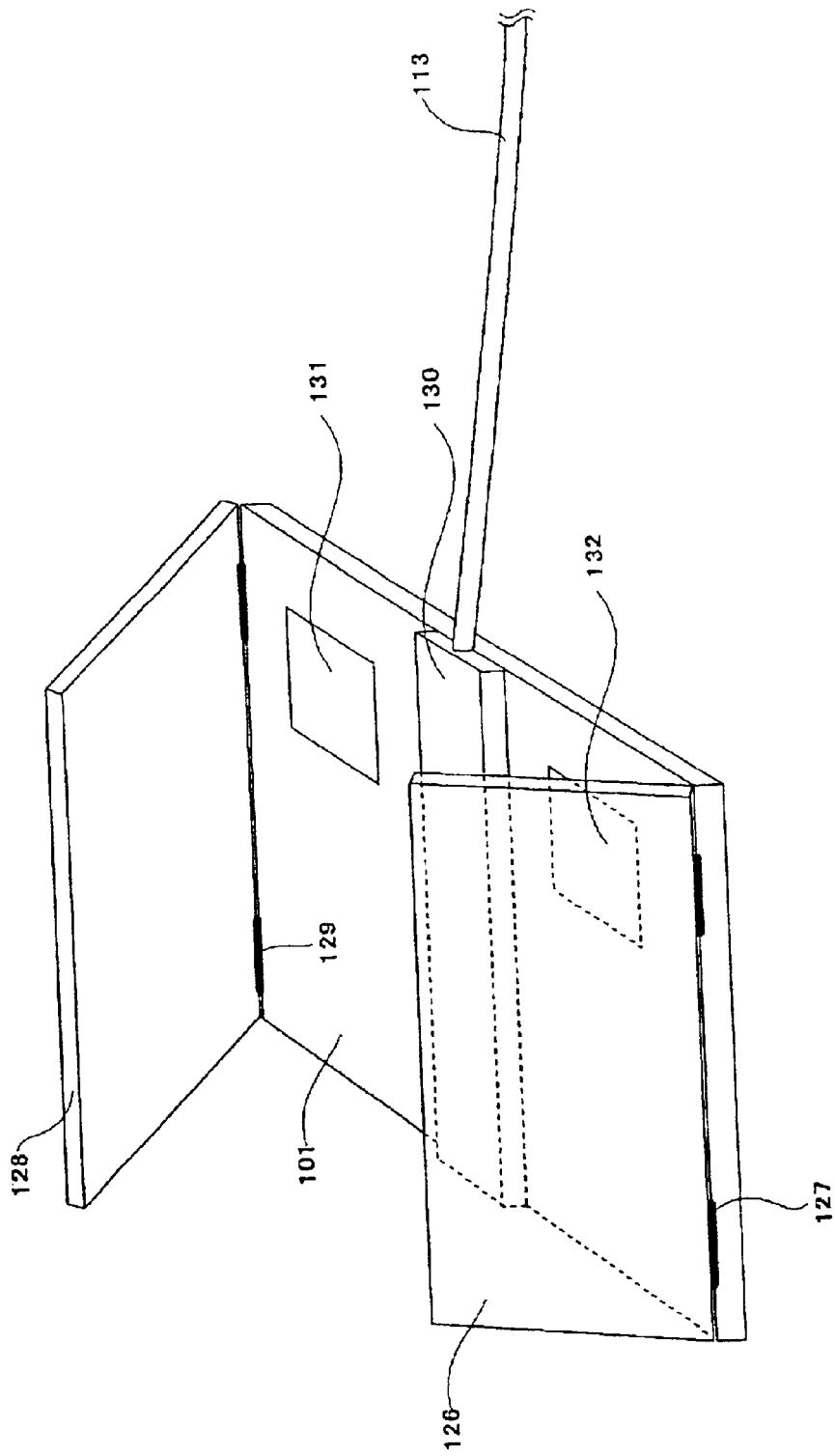

[Figure 8]
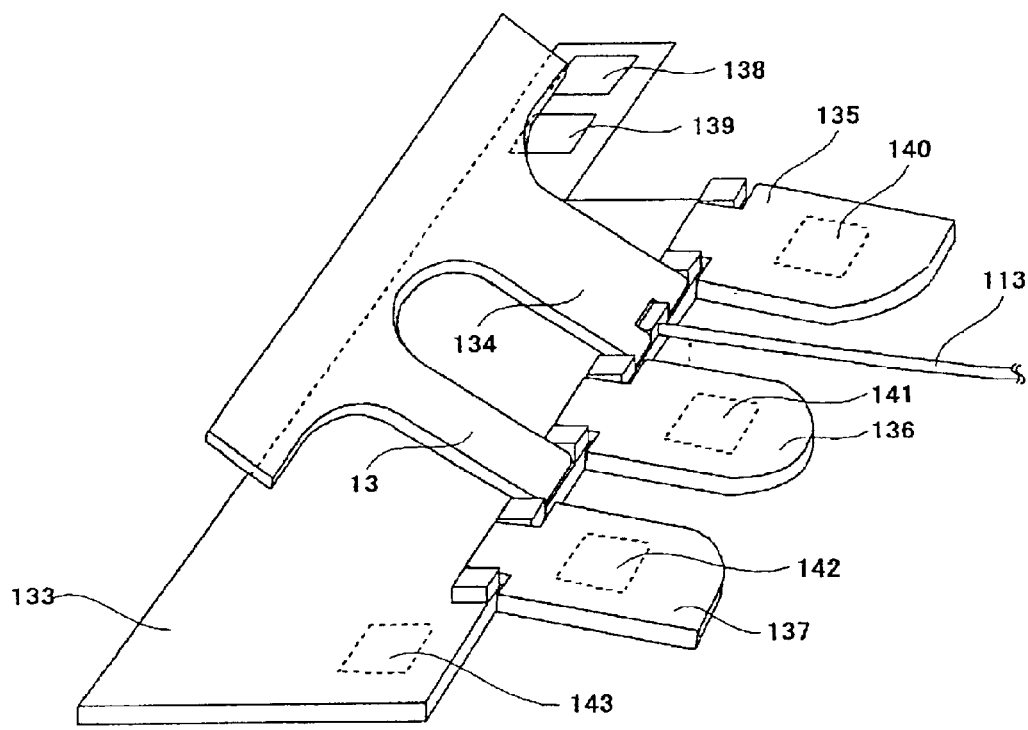
[Figure 9]
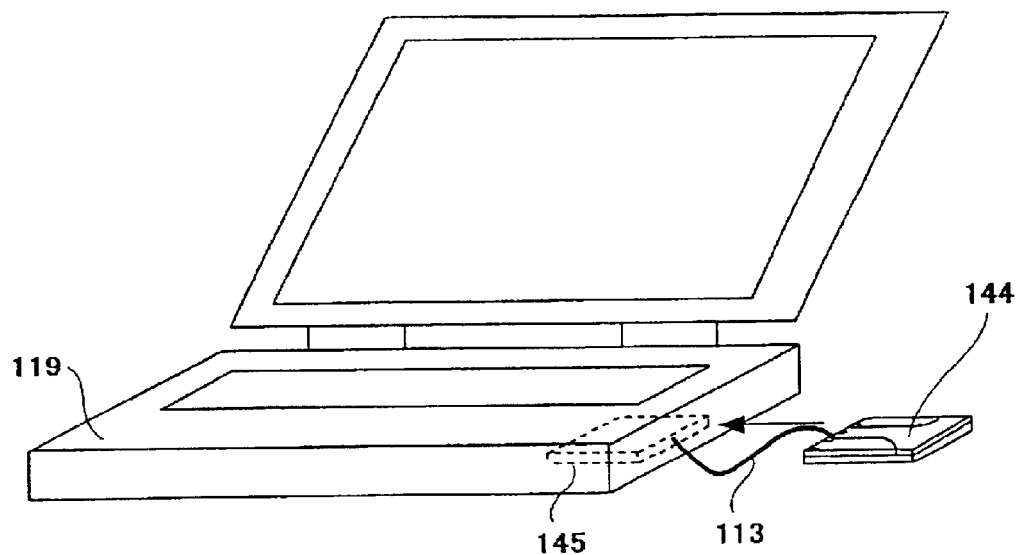

[Figure 10]
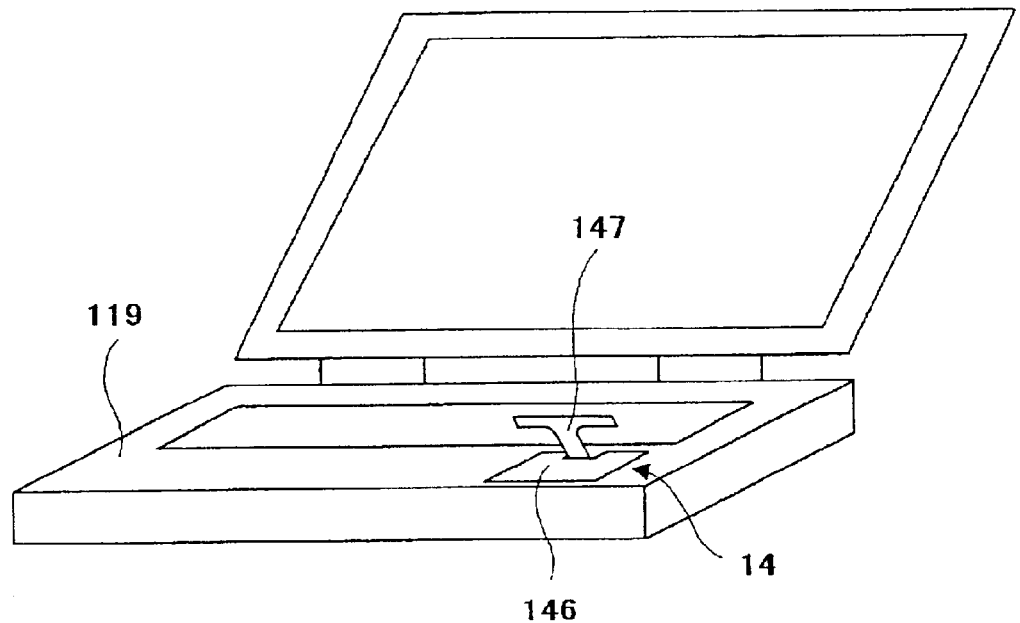
[Figure 11]
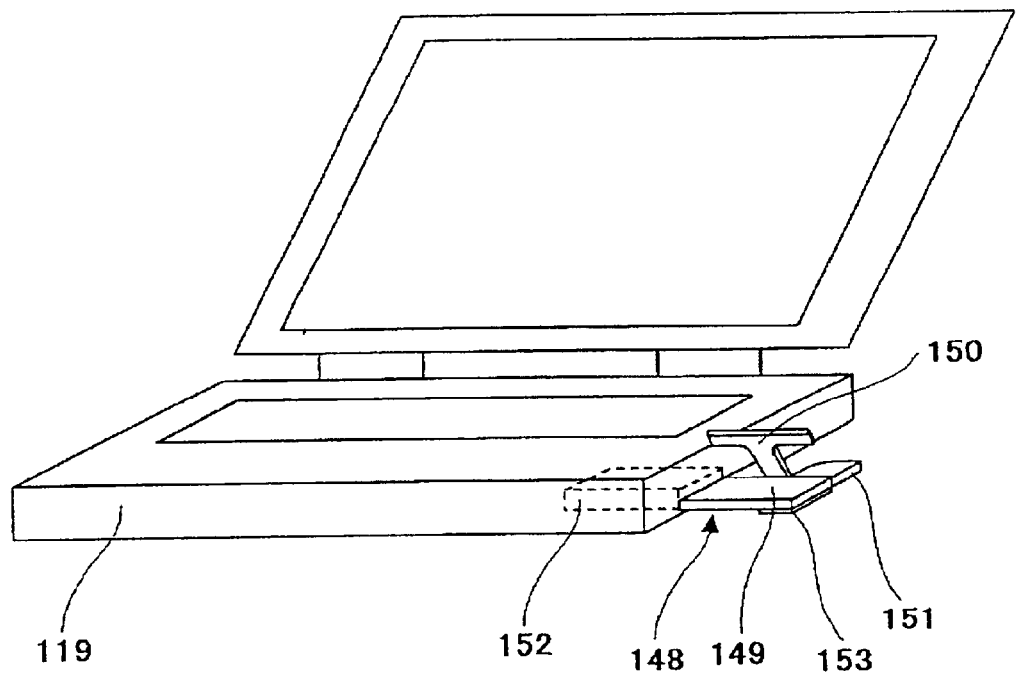

[Figure 12]
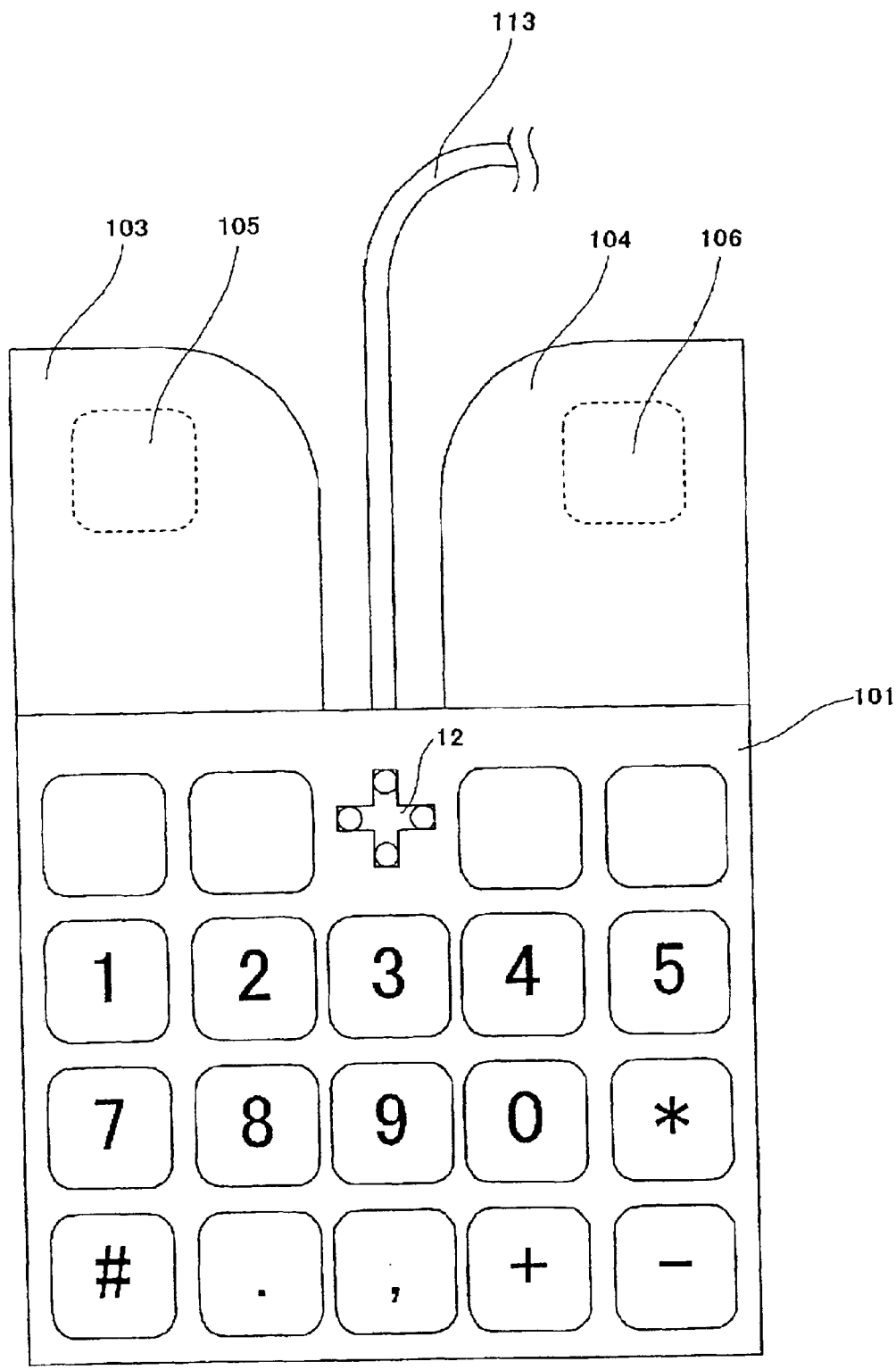

[Figure 13]
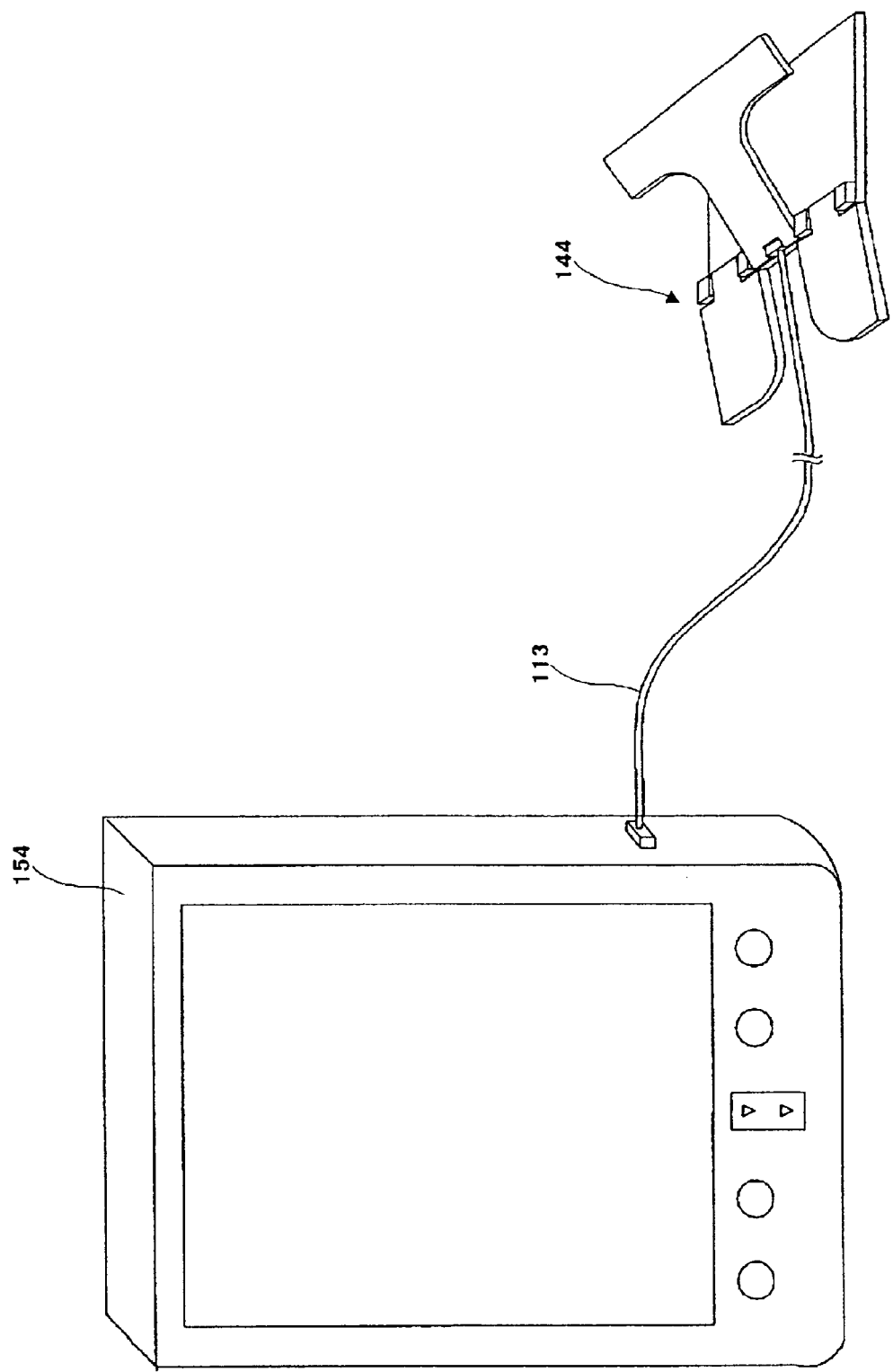

INPUT UNIT AND INFORMATION PROCESSING UNIT

BACKGROUND OF THE INVENTION

The present invention relates to an input unit having the same function as a mouse and to an information processing unit equipped with such an input unit. In particular, it relates to a technology for rendering the input unit foldable and improving its mountability and portability.

In general, a mouse is used as a supplemental input means of a desktop personal computer. The mouse usually has a half-oval shape comprised of gentle curves and a size to be wrapped in a palm. A computer incorporating a GUI (graphical user interface) can be mostly operated by the mouse.

On the other hand, a pointing device for performing the same operations as the mouse without using one is used in the case of a notebook-sized personal computer. For instance, it has a pad section on a computer main unit, where a pointer such as an arrow is moved by tracing the pad section with a finger and operations such as selection are performed by clicking on buttons placed close to the pad section or by double-clicking on the pad. In addition, there are also ones configured so that a projection is provided in a keyboard layout and the pointer moves in a direction of power applied to the projection. Such pointing devices improve mountability to the notebook-sized personal computer so as to release a user from inconvenience of having to carry the mouse with a system.

However, the functions of these pointing devices are not as easy to use as those of the mouse so that there are users who want to use the mouse with the notebook-sized personal computer. It is necessary to improve the portability of the mouse in order to use it with the notebook-sized personal computer. As an idea of solving the inconvenience of carrying the mouse, for instance, the technology of the Japanese Published Unexamined Patent Application No. 09-244805 or the Japanese Published Unexamined Patent Application No. 2000-105631 shows a configuration wherein the mouse can be incorporated into a housing of the notebook-sized personal computer for storage.

However, the mouse itself utilized in the technology described in the above described patent applications is one of a conventional configuration and is not configured to be stored inside the notebook-sized personal computer. Thus, it is necessary to carry the mouse separately from the computer. On the other hand, it is difficult to secure space for storing the conventional mouse in the notebook-sized personal computer that is increasingly becoming smaller and lower-profile.

A purpose of the present invention is to provide an input unit having the same functions as a conventional mouse and still higher operability allowing the inconvenience of carrying it to be eliminated or reduced. Another purpose of the present invention is to provide an information processing unit equipped with such an input unit.

SUMMARY OF THE INVENTION

An overview of the present invention will be described as follows. To be more specific, an input unit of the present invention comprises a sensor for detecting displacement of a position, a plate-like main unit having the above described sensor, a finger support member of which one end is pivotably supported by the above described main unit, and becoming plate-shaped by folding the above described finger support member. In this case, it can be configured to further comprise an open-close member of which one end is pivotably supported by the above described main unit, and switches provided to the above described open-close member and become plate-shaped by folding the above described finger support member and the above described open-close member. Further in this case, it can be equipped with two pieces of the above described open-close member and it is possible to operate the respective switches of the above described open-close members in a state of sandwiching the above described finger support member between two fingers. Alternatively, it can have a plurality of the above described open-close members placed, which can be placed corresponding to the fingers performing input operations.

In addition, the input unit of the present invention can be configured so that switches provided to the above described main unit are operated by putting fingertips between the above described main unit and the above described finger support member in an open state. In this case, it can adopt either a first configuration wherein the above described finger support member is single and the above described fingertips are inserted almost vertically to the pivotal direction of the above described finger support member, or a second configuration wherein there are a plurality of the above described finger support members provided and the above described fingertips are inserted almost in parallel with the pivotal direction of the above described finger support members.

Moreover, the above described input unit can be stored in free space of an information processing unit such as an IC card slot in a state of folding the above described finger support member and open-close member.

As such an input unit constrains the fingers three-dimensionally with the plate-like main unit and the lifted finger support member, it keeps the fingers from slipping while moving the input unit so that moving operations can be easily performed. In addition, folding it in a state of a plate makes it easy to be stored in the information processing unit and carried. Furthermore, folding it allows it to be stored in free space such as storage space of the IC card provided to a notebook-sized personal computer, for instance, so as to release a user from inconvenience of carrying it.

Moreover, the present invention can be widely utilized for information processing units using a mouse. For instance, it can be utilized for a desktop personal computer, a notebook-sized personal computer, a personal digital assistant, a portable telephone, an electronic book, a portable GPS receiver, a TV receiver with an information processing function, a game machine and so on.

The advantages acquired by representative embodiments of the invention disclosed by this application are as follows. To be more specific, it can provide an input unit having the same functions as the conventional mouse and still higher operability allowing the inconvenience of carrying it to be eliminated or reduced. It can also provide an information processing unit equipped with such an input unit.

BRIEF DESCRIPTION OF THE DRAWINGS

Some of the purposes of the invention having been stated, others will appear as the description proceeds, when taken in connection with the accompanying drawings, in which:

FIG. 1 is a perspective view showing an overview of a usage state of an input unit according to an embodiment of the present invention;

FIG. 2 is a perspective view showing an overview of a folded state of the input unit according to this embodiment;

FIG. 3 is a sectional view showing an overview of a sectional configuration of the input unit according to this embodiment;

FIG. 4 is a diagram showing a state of the input unit according to this embodiment folded and stored in a case;

FIG. 5 is a diagram showing a state of a case containing the input unit according to this embodiment stored in an IC card placement slot of a notebook-sized personal computer;

FIG. 6 is a perspective view showing an overview of an input unit that is another embodiment of the present invention;

FIG. 7 is a perspective view showing an overview of an input unit that is a further embodiment of the present invention;

FIG. 8 is a perspective view showing an overview of an input unit that is a still further embodiment of the present invention;

FIG. 9 is a perspective view showing an example of a notebook-sized personal computer that is a still further embodiment of the present invention;

FIG. 10 is a perspective view showing an example of a notebook-sized personal computer that is a still further embodiment of the present invention;

FIG. 11 is a perspective view showing an example of a notebook-sized personal computer that is a still further embodiment of the present invention;

FIG. 12 is a top view showing an example of an input unit that is a still further embodiment of the present invention; and FIG. 13 is a diagram showing an example of utilizing the input unit that is an embodiment of the present invention for a personal digital assistant.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention. Moreover, the same numbers are given to the same elements throughout the embodiments.

Embodiment 1

Referring now more particularly to the accompanying drawings, FIG. 1 is a perspective view showing an overview of a usage state of an input unit according to an embodiment of the present invention. FIG. 2 is a perspective view showing an overview of a folded state of the input unit according to this embodiment. FIG. 3 is a sectional view showing an overview of a sectional configuration of the input unit according to this embodiment. FIG. 4 is a diagram showing a state of the input unit according to this embodiment folded and stored in a case. FIG. 5 is a diagram showing a state of a case containing the input unit according to this embodiment stored in an IC card placement slot of a notebook-sized personal computer.

The input unit shown in FIG. 1 is equipped with a plate-like main unit 101, a finger support section 102 pivotably supported by the above described main unit 101, open-close members 103 and 104 pivotably supported by the plate-like main unit 101. Folding the finger support section 102 and open-close members 103 and 104 changes it from the state in FIG. 1 to the overall plate-like shape in FIG. 2.

The plate-like main unit 101 is comprised of resin for instance, and has an optical sensor on its backside as shown in FIG. 3. The optical sensor reflects light irradiated from a light emitting device 114 on an irradiated plane 115 and captures the reflected light by a photo-detector 116 so as to detect relative movement against the irradiated plane 115 of the plate-like main unit 101. While FIG. 3 shows a pair of a light emitting device and a photoreceptor, in reality, there may be another pair of them placed in order to detect movement in a direction different by 90 degrees or images may be processed on the photoreceptor side. A dedicated pad with a mesh printed is used on the irradiated plane to improve accuracy of reading the reflected light, but it is not limited thereto. It may be anything forming a pattern causing light scattering from which relative movement can be detected, such as a desk surface, paper, an appropriately uneven or mesh-patterned plane-like object, cloth, a palm or part of a body.

The finger support section 102 is comprised of resin and pivotably supported by a pivotably supporting member 108 provided to the plate-like main unit 101, and is fixed to the plate-like main unit 101 in a reclosable manner. To be more specific, an unillustrated axis is jutting from the pivotably supporting member 108 in the direction of a pivotably supported section 107 of the finger support section 102, and this jutting axis is in an axially rotatable state inside the pivotably supported section 107 of the finger support section 102. Moreover, the finger support section 102 stops, on opening to the plate-like main unit 101, at a free opening angle such as 75 degrees or so.

The open-close members 103 and 104 are comprised of resin for instance, and have switches 105 and 106 comprised of pressure sensors respectively and pivotably supported by pivotably supporting members 110 and 112 provided to the plate-like main unit 101, and are fixed to the plate-like main unit 101 in a reclosable manner. To be more specific, an unillustrated axis is jutting from the pivotably supporting member 110 in the direction of a pivotably supported section 109 of the open-close member 103, and this jutting axis is relatively in an axially rotatable state inside the pivotably supported section 109. Likewise, an unillustrated axis is jutting from the pivotably supporting member 112 in the direction of a pivotably supported section 111 of the open-close member 104, and this jutting axis is relatively in an axially rotatable state inside the pivotably supported section 111. The open-close member 103 opens by a free angle such as 190 degrees or so, and in the case of pressing the plate-like main unit 101 against an appropriate plane in the open state, its end contacts the plane.

To use the input unit shown in FIG. 1, the finger support section 102 and the open-close members 103 and 104 are put in an open state (as in FIG. 1), and the finger support section 102 is sandwiched by two fingers (normally the forefinger and the middle finger of the right hand) and one of the fingers (for instance, the forefinger of the right hand) is further placed on the switch 106 and the other (for instance, the middle finger of the right hand) on the switch 105 to operate it. The input unit is moved, in a state where the plate-like main unit 101 is contacting the appropriate plane, by sliding the plate-like main unit 101 on the plane in a parallel direction therewith while sandwiching the finger support section by two fingers. In this case, as the finger support section is sandwiched by two fingers, the input unit is moved smoothly with no inconvenience of operations. A right click and a left click of the input unit are performed by pressurizing the switches 106 and 105 from fingertips. As the input unit is operable in a state where it is fixed in a palm, it is not especially required to keep holding the unit. This improves operability and besides, the palm (such as the right hand) fixing the input unit can be used almost freely, so that keyboard operations and so on can be performed while holding the input unit. In addition, it is possible to operate the input unit in a relaxing manner by putting the palm on a part of the body such as a lap.

Signals from the input unit are transmitted to an information processing unit such as a personal computer via a connecting cable 113.

When not using the input unit shown in FIG. 1, the finger support section 102 and the open-close members 103 and 104 can be folded as shown in FIG. 2 and stored in a case 117 as shown in FIG. 4. Moreover, FIG. 4 shows a state where a USB connector 118 for connecting the input unit to the information processing unit is mounted on the other end of the connecting cable 113.

In addition, the case 117 is set as a size to be stored in the IC card slot and the whole case 117 can be stored as-is in an IC card slot 120 of a notebook-sized personal computer 119 as shown in FIG. 5. In the case where the IC card slot 120 is unused, a dummy card for maintaining strength of the main unit may be inserted. The input unit of this embodiment can be inserted instead of such a dummy card and contribute to maintenance of the housing strength of the unused slot portion.

Moreover, while the above description showed an example of storing it in the IC card slot, it is not limited thereto. It is also possible otherwise to separately provide a storage space on the notebook-sized personal computer to store it. It is also possible to carry the case 117 in a state of storing it.

Furthermore, while the above description showed an example of using the optical sensor as a sensor for detecting movement of the input unit, it is not limited thereto. It is also possible otherwise to adopt another mechanism such as a mechanical configuration for detecting rotation of a small trackball or a configuration using an acceleration sensor.

In addition, wireless means may also be used as a method of transmitting signals from the input unit. For instance, an infrared transmission method or a transmission method using a microwave zone electromagnetic wave may be used.

Furthermore, switches with a click mechanism may be used as the switches 105 and 106.

Another method of using this embodiment can be illustrated, that is, a method of tracing the backside (a face contacting a desk surface and so on) of the plate-like main unit 101 with a fingertip of a free hand in a state of holding the input unit in a palm to operate a cursor.

Embodiment 2

FIG. 6 is a perspective view showing an overview of an input unit that is another embodiment of the present invention. The input unit shown in FIG. 6 is configured so that the plate-like main unit 101 with an unillustrated optical sensor comprised of resin for instance, placed on its backside has a plate-like open-close member (finger support member) 121 also comprised of resin pivotably supported on one side thereof in a reclosable manner like a hinge.

The open-close member 121 is pivotably supported by a pivotably supporting section 122 provided to the plate-like main unit 101. To be more specific, an unillustrated axis is jutting from the pivotably supporting section 122, and this axis snaps in a portion of a pivotably supported section 123 of the open-close member 121 in an relatively rotatable state. In addition, the plate-like main unit 101 is equipped with switches 125 and 124 that are pressure sensors. Moreover, an opening angle between the plate-like main unit 101 and the open-close member 121 is 45 degrees or so at the maximum.

The input unit is operated, in a state of opening the open-close member (finger support member) 121 as shown in FIG. 6, by putting fingertips of two fingers (the forefinger and the middle finger, for instance) between the plate-like main unit 101 and the open-close member (finger support member) 121 that is opened. To be more specific, two fingertips are thrusted between the plate-like main unit 101 and the open-close member 121 that are opened in a V-shaped manner so that the input unit is operated in a state where the middle portion of the fingers is contacting the plate-like main unit 101 and the nail side of the fingers is contacting the open-close member 121. When moving the input unit, it can be easily operated since the fingertips are fixed to an extent by the plate-like main unit 101 and the open-close member 121. In addition, a right click and a left click are performed by pushing the switch 125 with the right finger and pushing the switch 124 with the left finger.

Even in this configuration, folding the open-close member (finger support member) 121 makes it plate-like as a whole and allows it to be stored in a case and then in the PC card slot of the notebook-sized personal computer as in the embodiment 1. As a matter of course, it can be folded and carried as-is. Other variations are the same as in the embodiment 1.

Embodiment 3

FIG. 7 is a perspective view showing an overview of an input unit that is a further embodiment of the present invention. The input unit shown in FIG. 7 is configured so that the plate-like main unit 101 with an unillustrated optical sensor comprised of resin for instance, placed on its backside has plate-like open-close members (finger support members) 126 and 128 also comprised of resin pivotably supported on an opposite side thereof in a double-door reclosable manner like a hinge.

The open-close member (finger support member) 126 is pivotably supported by the plate-like main unit 101 in a pivotably supported section 127, and the open-close member (finger support member) 128 is pivotably supported by the plate-like main unit 101 in a pivotably supported section 129. The plate-like main unit 101 is equipped with switches 131 and 132 comprised of pressure sensors. Moreover, it has a convex section 130 traversing from end to end at the center. The open-close members 126 and 128 can be folded to be of the same height and on the same plane as the convex section 130.

This input unit is operated, in a state of opening the two open-close members (finger support members) 126 and 128 as shown in FIG. 7, by positioning one of the two fingers along a direction of the open-close axis of sectional V space comprised of the plate-like main unit 101 and the open-close member (finger support member) 126 and positioning the other finger along the direction of the open-close axis of sectional V space comprised of the plate-like main unit 101 and the open-close member 128.

In this configuration, it is easy to move the input unit since the fingers contact the plate-like main unit 101 and the open-close members (finger support members) 126 and 128 three-dimensionally. It also contributes to high operability to have the fingers contact the convex section 130. In addition, folding the open-close members 126 and 128 makes it plate-shaped as a whole and allows it to have the same advantage as the embodiment 1.

Moreover, variations of this embodiment are the same as those shown in the embodiment 1.

Embodiment 4

This embodiment relates to an input unit having at least two or more switches, one of which is given a different function, and besides, a plurality of finger support members are placed.

FIG. 8 is a perspective view showing an example of an input unit capable of ten key input. The input unit shown in FIG. 8 is equipped with a plate-like main unit 133, finger support sections 134 and 13 pivotably supported by the plate-like main unit, open-close members 135,136 and 142 pivotably supported by the plate-like main unit 133, switches 138 and 139 placed on the plate-like main unit, a switch 140 placed on the open-close member 135, a switch 141 placed on the open-close member 136, a switch 142 placed on the open-close member 137, a cable 113 connected to a personal computer and so on. This input unit becomes plate-like as a whole by the folding finger support member 134 and 13 and the open-close members 135, 136 and 137 and putting then upon the plate-like main unit 133.

How to use this input unit is described hereafter. First, the finger support sections 134 and 13 are lifted from the plate-like main unit 133 and all the open-close members are opened to put it in the state of FIG. 8. In this state, the finger support member 134 is sandwiched between the forefinger and the middle finger of the right hand, the finger support member 13 is sandwiched between the middle finger and a third finger, so as to locate the forefinger near the switch 140, the middle finger near the switch 141, the third finger near the switch 142, the little finger near the switch 143 and the thumb near the switches 138 and 139.

Here, in a state of moving the thumb off the switches 138 and 139, the switch 140 is pushed by the forefinger to input "1", the switch 141 is pushed by the middle finger to input "2", the switch 142 is pushed by the third finger to input "3"and the switch 143 is pushed by the little finger to input "4". Furthermore, in a state of pressing the switch 138 by the thumb, the switch 140 is pushed by the forefinger to input "5", the switch 141 is pushed by the middle finger to input "6", the switch 142 is pushed by the third finger to input "7" and the switch 143 is pushed by the little finger to input "8". In addition, in a state of pressing the switch 139 by the thumb, the switch 140 is pushed by the forefinger to input "9", the switch 141 is pushed by the middle finger to input "0", the switch 142 is pushed by the third finger to input ",", and the switch 143 is pushed by the little finger to input ",". The ten key input is thus performed.

While the input unit of this embodiment can be utilized for various information processing units, it is especially suited to a use for a portable telephone wherein ten key operations are efficiently performed by using one hand. In addition, it allows stable one-hand operations because the two finger support sections are sandwiched by three fingers.

Moreover, the input unit of this embodiment allows an unillustrated optical sensor to be placed on the backside of the plate-like main unit 133 so as to move the cursor on a display just like an ordinary mouse. In this case, an appropriate change-over switch should be placed so that the switch 140 becomes a left click button and the switch 141 becomes a right click button.

It is also possible to leave out one of the switches 138 and 139 by placing an appropriate sensor and selecting the two conditions according to change in the direction of inclination of the input unit. Moreover, it is also possible to leave out one of the switches 138 and 139 by placing an acceleration sensor and selecting the two conditions of putting down and lifting up the input unit.

Embodiment 5

FIG. 9 is a diagram showing a still further embodiment of the present invention. The configuration shown in FIG. 9 has a dedicated storage space 145 provided to the notebook-sized personal computer 119 in which a folded input unit 144 is stored. As for the input unit, the ones described in the embodiments 1 to 4 are applicable. This configuration has a connecting interface to the main unit of the notebook-sized personal computer 119 in the storage space 145, where the input unit 144 is connected to the main unit thereof via the cable 113. Inside the storage space 145, there may be an appropriate winding mechanism for winding up the connecting cable 113 provided.

When the notebook-sized personal computer 119 is not operated, the input unit 144 is folded and stored in the storage space 145. To operate the notebook-sized personal computer 119, the folded input unit 144 is drawn out of the storage space 145 and opened in a state as shown in FIG. 1 for instance to be operated as shown in the embodiment 1 for instance.

The storage space 145 can be either one specifically provided or a PC card slot utilized.

Embodiment 6

FIG. 10 is a perspective view showing a still further embodiment of the present invention. The configuration shown in FIG. 10 has an input unit 14 incorporated into the notebook-sized personal computer 119. The input unit 14 is equipped with a plate-like main unit 146 fixed on the main unit of the notebook-sized personal computer 119, and a finger support section 147 pivotably supported by the above described main unit 146. The finger support section 147 can manipulate up and down directions of the cursor (up and down directions on the display) by its opening angle. In addition, leftward movement of the cursor can be manipulated by applying force to incline the finger support section 147 leftward, and rightward movement of the cursor by applying force to incline the section rightward.

In a pivotably supported section of the finger support section 147, there are a sensor for measuring an open/close angle of the finger support section 147 and a sensor for detecting the rightward and leftward force applied to the finger support section 147. In addition, there are unillustrated switches provided to the right and left front portions of the pivotably supported section of the finger support section 147.

In a state where the notebook-sized personal computer 119 is not used, the finger support section 147 is folded. To use the notebook-sized personal computer, the lifted finger support section 147 is sandwiched between the forefinger and the middle finger of the right hand, which fingers are further located at the aforementioned switches respectively. And the cursor is moved by opening and closing movement of the finger support section 147 and application of power thereto to the right and left, and the right and left clicks are performed by pushing unillustrated switches by the forefinger and the middle finger.

Moreover, the input units configured as described in the embodiments 2 to 4 can be incorporated in the same manner as the above described.

Embodiment 7

FIG. 11 is a perspective view showing a still further embodiment of the present invention. The configuration shown in FIG. 11 allows an input unit 148 to be stored slidingly into the storage space 152 of the notebook-sized personal computer 119. In this configuration, the input unit 148 cannot be removed from the notebook-sized personal computer 119 since it is a part thereof.

The input unit 148 is equipped with a plate-like main unit 149, a finger support section 150 and an open-close member 151 pivotably supported by the above described main unit. The input unit 148 has the same basic configuration as one shown in FIG. 1. Moreover, there is an unillustrated open-close member on the left side sandwiching the finger support section 150 against the open-close member 151 on the right side. There is a switch placed on each of the open-close members. In addition, a contact member 153 may be placed so that, on drawing out the input unit 148 from the storage space 152, the input unit 148 can stabley contact a placement face of a desk and so on.

When the notebook-sized personal computer 119 is unused, the finger support section 150, the open-close member 151 and the unillustrated open-close member are folded and put upon the plate-like main unit 149 so as to store the entire input unit 148 in the storage space 152.

When using the notebook-sized personal computer 119, the input unit 148 is drawn out slidingly from the storage space, and the finger support section 150, the open-close member 151 and the unillustrated open-close member are lifted. And the finger support member 150 is sandwiched between the forefinger and the middle finger so as to locate the forefinger at the switch of the unillustrated open-close member (located behind the finger support member 150 in the drawing) and the middle finger at the switch of the open-close member 151. And in this state, the cursor is moved up and down by opening and closing of the finger support member 150, and to the right and left by applying force to the finger support section to the right and left.

When operating the input unit, the underside of the contact member 153 and that of the notebook-sized personal computer are the same plane against a placement face of a desk and so on. Thus, there is no excessive force applied to the input unit on operations.

Moreover, the input units in the above described embodiments 2 to 4 can be applied as a matter of course.

Embodiment 8

FIG. 12 is a top view showing a still further embodiment of the present invention. The input unit shown in FIG. 12 has character input keys provided on a plane opposite to the plane where the finger support section 102 of the plate-like main unit 101 is provided. To be more specific, the character input keys are placed on the backside (the face contacting the placement face of the input unit) of the plate-like main unit 101 that is the input unit shown in FIG. 1 turned upside down. This configuration has an optical sensor 12 for detecting movement of the input unit and a ten key input switch placed on the backside of the plate-like main unit 101.

The input unit shown in FIG. 12 can be used as an input unit like an ordinary mouse just as the one shown in FIG. 1, and if entirely turned upside down, ten key input operations can be performed on its backside.

The ten key input operations are performed as follows. First, the finger support section 102 of the input unit in the state shown in FIG. 1 is sandwiched between adequate two fingers of the right or left hand. At this time, the palm should contact the top face (the face on which the finger support section 102 is provided) of the plate-like main unit 101. And the palm is turned over so that the backside of the input unit shown in FIG. 12 comes atop on the palm. In this state, the ten key input operations are performed by the other free hand. At this time, the ten key input operations are easily performed since the input unit is securely fixed by the two fingers.

As the switches 105 and 106 are not utilized on the ten key input operations in the state shown in FIG. 12, the open-close members 103 and 104 can remain folded.

Moreover, to switch between the case of using the input unit as an ordinary mouse and the case of performing the ten key input operations, it is possible to turn off the ten key input function when only using it as an ordinary mouse by a gravitational switch for instance.

In addition, in the state shown in FIG. 12, it is possible to manipulate the cursor by tracing by the other free hand the optical sensor 12 exposed on the backside of the plate-like main unit 101. The right and left clicks can be performed by pushing the backside portions of the switches 105 and 106 respectively.

While FIG. 12 shows an example of ten key input, it is also possible to input the alphabet or the Japanese syllabary on the basis of the ten key input, just as placed on a portable telephone or a personal digital assistant. In addition, switches can be further provided on the backsides of the open-close members 103 and 104 in order to increase the input switches.

The number of keys, type of input characters, type of input symbols and key arrangement system are not limited to those set forth here, but can be adequately set according to usage purposes.

The input unit having the ten key input and character input functions in addition to advantageousness as a folding mouse is provided by adopting the configuration shown here.

While the above concretely described the invention made by the inventor based on the embodiments, the present invention is not limited to the above described embodiments and can be changed in various ways as far as it does not deviate from its abstract.

For instance, while the above described embodiments mainly explained examples of applying the input unit of the present invention to the notebook-sized personal computer, it is also applicable to the personal digital assistant as shown in FIG. 13. FIG. 13 is a drawing showing an example of utilizing the input unit of the embodiment of the present invention to the personal digital assistant. In FIG. 13, the input unit 144 is connected to the personal digital assistant 154 by the connecting cable 113. As this input unit is easy to carry compared with the conventional mouse, it is suitable for use in combination with the personal digital assistant.

In addition, while the above described embodiments illustrated a USB terminal for connecting the input unit with the computer, it is not limited thereto. A terminal of any other specifications can be used. It is also a matter of course that the input unit can be connected with the computer not only by cable means but also by using wireless means.

In the drawings and specifications there has been set forth a preferred embodiment of the invention and, although specific terms are used, the description thus given uses terminology in a generic and descriptive sense only and not for purposes of limitation.

I claim:

1. An input unit comprising:
   a sensor which detects a displacement;
   a plate-like main unit supporting said sensor;
   a finger support member pivotally coupled to said main unit;
   said sensor, said main unit, and said finger support member defining a plate-like structure when said finger support member is pivoted inline with said main unit;
   at least two open-close members, pivotally coupled to said main unit, each open-close member having a different switch coupled thereto;
   said sensor, said main unit, said finger support member, and said open-close member defining a plate-like structure when said finger support member and said open-close member are pivoted inline with said main unit, wherein operation of the respective switches of said open-close members is effected by sandwiching said finger support member between two provided fingers, wherein said switches are operable when the provided finger tips are placed between said main unit and said finger support member such that a user's fingers support said finger support member in a pivoted open state, wherein the plate-like structure is stowable in a card slot of an information processing unit.

2. An input unit comprising:

a sensor that detects a displacement;

a plate-like main unit supporting said sensor;

a finger support member pivotally coupled to said main unit;

said sensor, said main unit, and said finger support member defining a plate-like structure when said finger support member is pivoted inline with said main unit; and at least one switch coupled to said main unit, said switches being operable when the provided fingertips are placed between said main unit and said finger support member such that a user's fingers support said finger support member in a pivoted open state, wherein a plurality of said finger support members are provided in a configuration such that fingertip insertion is nearly parallel to the pivotal direction of said finger support members.

3. The input unit according to claim 2, wherein the plate-like structure is storable in any one of a card slot and a free space of an information processing unit.

4. An apparatus comprising:

an information processing unit;

an input unit;

said input unit further comprising:

a plate-like main unit having a sensor for detecting a displacement;

a finger support member pivotally coupled to said main unit;

at least two open-close members, pivotally coupled to said main unit, each of the at least two open-close members having a respective switch coupled thereto;

said main unit and said finger support member defining a plate-like structure when said finger support member is pivoted inline with said main unit, wherein operation of the respective switches is effected by sandwiching said finger support member between two fingers; and wherein said switches are operable when the provided fingertips are placed between said main unit and said finger support member such that a user's fingers support said finger support member in a pivoted open state.

5. Apparatus according to claim 4, wherein said input unit, when configured as said plate-like structure, is storable in any one of a card slot and a free space of said information processing unit.

6. Apparatus according to claim 4, having a plurality of said open-close members corresponding to and placed for engagement with that number of fingers provided for performing input operations.

7. Apparatus according to claim 4, wherein said finger support member is singular and configured such that fingertip insertion is nearly vertical to the pivotal direction of said single finger support member.

8. An apparatus comprising:

an information processing unit;

an input unit, said input unit including a plate-like main unit having a sensor for detecting a displacement;

a plurality of finger support members pivotally coupled to said main unit, said main unit and said finger support members defining a plate-like structure when said finger support members are pivoted inline with said main unit;

at least one switch coupled to said main unit, said at least one switch being operable when fingertips are placed between said main unit and said finger support member such that a user's fingers support said finger support member in a pivoted open state; wherein said plurality of said finger support members are provided in a configuration such that fingertip insertion is nearly parallel to the pivotal direction of said finger support members.

9. Apparatus according to claim 8, wherein said input unit, when configured as said plate-like structure, is storable in any one of a card slot and a free space of said information processing unit.

* * * * *